UNITED STATES PATENT OFFICE 2,126,841

AZO DYESTUFFS AND THEIR PRODUCTION

Alfred Thurm, Dessau in Anhalt, Germany, assignor to General Aniline Works, Inc., New York, N. Y., a corporation of Delaware No Drawing. Application May 27, 1935, Serial No. 23,739. Renewed November 10, 1937. In Germany May 26, 1934

15 Claims. (Cl. 260—84)

(Granted under the provisions of sec. 14, act of March 2, 1927; 357 O. G. 5)

Under various names, such as Sudan-dyes, Fat-dyes, Ceresine-dyes, Cerotine-dyes, there have been introduced into the trade dyes which are used for coloring organic solvents, particularly hydrocarbons, and also find use in lacquers, oils, fats, waxes and products made therefrom. They are dyestuffs insoluble in water and for the most part belonging to the class of azo dyes. Since these dyes are used in a process which merely involves dissolution in a solvent it is essential that a dye of this class should be soluble in an organic solvent. Sparingly soluble dyes or those having high tendency to crystallize give unsightly, pale or spotty colorings.

In practice, however, it does not suffice if the dye in question dissolves well in a group of solvents, for instance, in esters or organic acids (for instance, ethyl acetate or butyl acetate), while in others, such as benzene, xylene, linseed oil, turpentine or saturated hydrocarbons, the dye dissolves but little or practically not at all. It is required of a dye of this class that it should dissolve well in the majority of the organic media coming into question or at least should dissolve in these in a proportion sufficient for practical purposes.

This invention relates to the manufacture of valuable dyes thoroughly suitable for the above purpose, by diazotizing mixtures of aniline derivatives which are free from groups that lend solubility in water and contain in the nucleus aliphatic radicles of the constitution

wherein R is an alkyl radicle, and coupling the product with a component capable of coupling containing no group lending solubility in water. Mixtures of aniline derivatives thus characterized are, for example, mixtures of ortho- and para-amino-iso-propylbenzene, ortho- and para-amino-sec.-butylbenzene, ortho- and para-amino-sec.-amylbenzene and the like.

Such mixtures of bases are obtained by nitrating a derivative of benzene which contains an alkyl radicle of the kind defined above and reducing the nitro compound to the amine in known manner. In this respect it is of particular value that one starts, not from pure individual alkyl-benzenes, which frequently can be obtained only with difficulty, but can use alkylbenzenes which are obtainable commercially both easily and cheaply. In elucidation of the foregoing statement reference may be made to the production of a mixture of amino-butyl-benzenes. In the action of sec.-butylchloride on benzene in manifold excess in presence of anhydrous aluminium-chloride, there is obtained, as is known, sec.-butyl-benzene. Nitration of this sec.-butyl-benzene yields a mixture of ortho- and para- (probably also some meta-) -nitro-compound. Reduction leads to a mixture of ortho-, para- and meta-sec.-amino-butyl-benzene.

Sec.-butyl-benzene may, however, also be obtained by condensing prim.-butylchloride with benzene. Thus in the manufacture of sec.-butyl-benzene one is not limited to the use of the comparatively inaccessible sec.-butyl-chloride but may start from prim.-butyl-chloride or from a mixture of halogen-derivatives of butane, which may be obtained cheaply by various commercial processes.

The sec.-butyl-benzene thus obtained, however, is not unitary, as is shown by the boiling point. A separation of the sec.-butyl-benzene from this mixture is wearisome and associated with great loss. The invention shows that such a purification is not only unnecessary but that it is, indeed, of advantage to use this mixture as it is obtained for the manufacture of amino-butyl-benzene.

What is here said of amino-butyl-benzene applies analogously to other amino-alkyl-benzenes and also to mixtures of amino-alkyl-benzenes which are composed of amino-alkyl-benzenes having side chains of different lengths.

These mixtures of amino-alkyl-benzenes when diazotized and coupled with components capable of coupling, yield dyes which are characterized by an unusually high degree of solubility in organic solvents. Concerning the enhanced solubility of the dyes obtainable by this invention, as compared with similarly constructed dyes, the following table may be consulted. The numbers relate to grams of dye which at the room temperature remain dissolved in 1000 cc. of the solvent. Intentionally the dyes selected are those made with use of 2,3-hydroxynaphthoic acid-anilide as passive component, this component yielding in general dyes sparingly soluble in organic media.

Table

| Diazo component | Solvent | | |
|---|---|---|---|
| | Benzene | Linseed oil | Butyl-acetate |
| Ortho-amino-ethylbenzene | About 5 | Approx. 2 | About 2 |
| Para-amino-ethylbenzene | About 10 | About 2 | About 4 |
| Mixture of ortho-, para- and meta-amino-ethyl-benzene | About 25 | About 5 | About 6 |
| Para-amino-isobutyl-benzene | Under 20 | About 2 | About 3 |
| Para-amino-prim.-butyl-benzene | About 30 | About 2 | About 6 |
| Mixture of ortho-, para- and meta-amino-prim.-butylbenzene | 20 | 5 | 6 |
| Para-amino-sec.-butyl-benzene | 200 | Under 20 | 20 |
| Ortho-, para- and meta-amino-sec.-butyl-benzene | 300 | 75 | 100 |
| Mixture of ortho-, para- and meta-amino-sec.- and prim.-butylbenzene | Over 300 | 100 | 100 |
| Mixture of ortho-, para-meta-amino-amyl-benzene | Over 400 | Over 150 | Over 100 |
| Mixture of amino-decyl-benzene | 200 | About 50 | About 25 |

The undoubted influence on the increase of solubility connected with the entry of the secondary butyl-group into the diazo component can clearly be seen from this table. It can also be gathered that the solubility is still further increased when there is used as diazo component a mixture of amino-sec.-butyl-benzenes.

It has been found that disazo dyes can be obtained from mixtures of bases of the kind above defined, which dyes are useful for coloring fats, when the diazo compounds of the amino-alkyl-benzene mixture are coupled with derivatives of the benzene or naphthalene series which contain no group lending solubility in water but have still a free amino group which can be further diazotized, and this amino-azo compound is further diazotized and coupled with a derivative of the benzene or naphthalene series which is free of any group which lends solubility in water. As intermediate components may be named, for example: meta-toluidine, para-xylidine, 1-methyl-3-amino-4-methoxy-benzene, 1-methyl-2-amino-4-methoxy-benzene, 2-amino-1,4-dialkoxy-benzene, 1-amino-2-alkoxy-naphthalene; and as end components, for example: para-cresol, cyclohexyl-phenol, meta-phenylenediamine, naphthols and their nuclear substitution products, β-alkyl-amino-naphthalene, amides of the hydroxynaphthoic acids substituted at the nitrogen by hydrocarbon radicles, particularly alkyl radicles.

In the following table there are set forth the solubilities of some disazo dyes in certain media. The constitution of the dyes follows the table.

| Dyestuff No. | Solvent | | |
|---|---|---|---|
| | Benzene | Linseed oil | Butyl acetate |
| 1 | Over 75 | Over 50 | Over 50 |
| 2 | Over 50 | Over 20 | Over 30 |
| 3 | Over 150 | About 20 | 40 |
| 4 | Over 50 | About 15 | About 20 |
| 5 | Over 100 | About 25 | About 20 |
| 6 | Over 100 | Over 10 | About 15 |
| 7 | 400 | About 150 | 300 |
| 8 | About 100 | About 20 | About 35 |
| 9 | About 100 | About 30 | About 40 |
| 10 | About 5 | About 2 | Under 2 |

Dye 1 is the combination
Amino-butylbenzene mixture⟶meta-toluidine⟶β-naphthol (Example 7)

Dye 2
Amino-butylbenzene mixture⟶para-xylidine⟶β-naphthol (Example 8)

Dye 3
Amino-butylbenzene mixture⟶cresidine⟶para-cresol

Dye 4
Amino-butylbenzene mixture⟶cresidine⟶1.4-methylnaphthol

Dye 5
Amino-butylbenzene mixture⟶cresidine⟶β-ethylamino-naphthalene

Dye 6
Amino-butylbenzene mixture⟶amino-hydroquinone-dimethyl-ether⟶β-naphthol (Example 10)

Dye 7
Amino-butylbenzene mixture⟶amino-hydroquinone-dimethyl-ether⟶para-cyclohexylphenol Dye 8
Amino-amylbenzene mixture⟶cresidine⟶β-naphthol Dye 9
Amino-amylbenzene mixture⟶cresidine⟶2,3-hydroxy-naphthoic acid-n-butylamide (Example 9)

Dye 10
Para-amino-prim.-butylbenzene⟶cresidine⟶β-naphthol

The amino-butylbenzene mixture or amino-amylbenzene mixture respectively, is obtainable as indicated, for instance, in Example 3 following hereafter. As mentioned above, these mixtures mainly consist of the secondary alkyl compounds, the alkyl group standing generally in the ortho- and para-position to the amino group. Other processes for producing these mixtures have been discussed in the paragraphs preceding the first table of this specification.

In the case of the disazo dyes the solubilities, as might be expected, do not attain the high values of those of the monoazo dyes. Still, here also if one compares the solubilities of the Dye 10, which is the last in the table, and is an individual containing a normal chain, with the solubilities of the remaining dyes which comprise mixtures of isomeric dyes with a forked chain it is clear that there is an increase of solubility.

The following examples illustrate the invention, the parts being by weight:

*Example 1.*—13.5 parts of a mixture of ortho-, para- and meta-amino-isopropylbenzene, obtained by nitrating by the usual method isopropylbenzene and reducing the mono-nitro product produced, are dissolved in 54 parts by volume of hydrochloric acid of 12° Bé. and water, and the solution is diazotized at 0 to 5° C. with 6.9 parts of sodium nitrite. The diazo solution is run through a filter into an ice-cold solution of 15 parts of β-naphthol in 8.8 parts of caustic soda and 800 parts of water. When the coupling is at an end, the mixture is heated to about 50° C., the liquid is decanted from the dye which has separated in the form of a thick oil, and this dye is treated a few times with lukewarm diluted caustic soda lye and then with water until of neutral reaction, and dried at 40° C. The dye crystallizes when allowed to stand at room temperature. It dissolves freely in various solvents; the color of its solution is orange.

*Example 2.*—A mixture of 14.9 parts of ortho-, para- and meta-amino-sec.-butylbenzene, which has been obtained by nitrating sec.-butylbenzene and reducing the nitro product thus produced, is dissolved in 300 parts of water and 54 parts by volume of hydrochloric acid of 12° Bé. and the solution is diazotized at 0 to 5° C. with 6.9 parts of sodium nitrite. The diazo solution is run through a filter at 5 to 10° C. into a solution of 27.6 parts of 2,3-hydroxynaphthoic acid-anilide in 10.5 parts of caustic soda and 800 parts of water. For separating unconsumed hydroxynaphthoic acid-anilide the mixture is heated when the coupling is at an end, to 50° C., filtered while lukewarm and the dye is again melted, if desired with dilute caustic soda lye. It is then washed until neutral and dried in a vacuum at about 50° C. The dye dissolves to a red solution in organic solvents.

*Example 3.*—14.9 parts of an amino-butylbenzene mixture of boiling point 115 to 144° C. under 14 mm. pressure, which has been obtained by condensation of prim.-butylchloride at 60° C. with benzene in the presence of anhydrous aluminium chloride, nitrating the butylbenzene mixture of boiling point 172–185° C. under 760 mm. pressure and reducing the nitro product, are dissolved in 300 parts of water and 54 parts by volume of hydrochloric acid of 12° Bé. at 0 to 5° C., and the solution is diazotized with 6.9 parts of sodium nitrite, coupled as described in Example 2 with 27.6 parts of 2,3-hydroxynaphthoic acid-anilide. The dye imparts a red color to organic media.

*Example 4.*—14.9 parts of amino-butylbenzene mixture of boiling point 115 to 144° C. under 14 mm. pressure are diazotized as described in Example 3 and the diazo solution is run through a filter at 5 to 10° C. into a solution of 18.5 parts of phenylmethylpyrazolone in 4 parts of caustic soda and 13 parts of calcined sodium carbonate in 300 parts of water. When coupling is at an end, the dye is melted, the supernatant aqueous solution is withdrawn and the dye is washed with dilute sodium carbonate solution and then with water and dried in a vacuum at 40 to 50° C. It is a thick yellow oil which dissolves easily in organic solvents to a yellow solution.

*Example 5.*—The diazo solution obtained as described in Example 3 is run through a filter into a solution of 16.9 parts of 2,4-dihydroxyquinoline in 26 parts of calcined sodium carbonate and 800 parts of water. The mixture is stirred for some hours at 0 to 5° C., then heated to about 50° C., filtered lukewarm and washed until neutral. The dye is dried in a vacuum at about 50° C. It is soluble in organic solvents to yellow solutions.

*Example 6.*—16.3 parts of amino-amylbenzene mixture of boiling point 128 to 140° C. under 15 mm. pressure are diazotized in the manner described in Example 2 for the mixture of ortho-, para- and meta-amino-sec.-butylbenzene and the diazo solution is coupled with 27.6 parts of 2,3-hydroxynaphthoic acid-anilide as described in Example 2. The amino-amylbenzene mixture is obtained as follows: A mixture of amylchlorides, obtained by chlorinating pentane, is condensed with benzene by the Friedel-Craft's reaction. The amylbenzenes of boiling point 188 to 200° C. under 754 mm. pressure are nitrated and the nitro product reduced in the usual manner. The dye dissolves easily in organic media to red solutions.

*Example 7.*—14.9 parts of amino-butylbenzene mixture of boiling point 115 to 144° C. under 14 mm. pressure, dissolved in 45 parts by volume of hydrochloric acid of 12° Bé., are diazotized with a concentrated aqueous solution of 6.9 parts of sodium nitrite with the use of as little ice as possible, and best while cooling by a cooling bath. When the nitrite has been consumed the diazo solution is run into a solution of 12 parts of meta-toluidine and 16 parts of anhydrous sodium acetate in 350 parts by volume of alcohol. The whole is stirred over-night and the alcohol is distilled on the following day. The monoazo dye, which has separated in the form of a thick oil, is washed by decantation with hot dilute hydrochloric acid from unconsumed meta-toluidine; then stirred with 54 parts by volume of hydrochloric acid of 12° Bé. and some hot water and diazotized, after adding ice, with 6.9 parts of sodium nitrite. The volume for diazotization is brought to 1500 parts by volume by addition of water. After several hours, the aminoazo dye has passed into solution. This diazo solution is run through a filter into an aqueous solution containing 14.4 parts of β-naphthol and 9.5 parts of caustic soda. When coupling is at an end, the dye is washed with dilute caustic soda lye and then with water and dried in a vacuum. It dissolves easily in organic solvents to a bluish-red solution.

By coupling the diazo compound of the monoazo-dye with 2,3-hydroxynaphthoic acid-isohexylamide (obtained by condensing commercial isohexylamine with 2,3-hydroxynaphthoic acid) there is obtained a dye of essentially bluer tint, the solubilities of which are in part still higher.

*Example 8.*—14.9 parts of aminobutyl-benzene mixture of boiling point 115 to 144° C. under 14 mm. pressure are diazotized. When the sodium nitrite has been consumed there is added a solution of 12.1 parts of para-xylidine in 18 parts by volume of hydrochloric acid of 12° Bé. and 200 cc. of water, and then an aqueous solution of 42 parts of crystallized sodium acetate; the whole is stirred, first at 0 to 5° C. and then at room temperature, until the diazo reaction has vanished or is only feeble. The whole is further heated for 1½ hours to 2 hours at about 80° C. and then mixed with 54 parts by volume of hydrochloric acid of 12° Bé., the mixture cooled and then filtered and the solid matter washed with dilute hydrochloric acid containing common salt. For the purpose of diazotizing the hydrochloride of the monoazo dye the latter is stirred with 36 parts by volume of hydrochloric acid at 12° Bé. and, after addition of ice and water, diazotized with a solution of 6.9 parts of sodium nitrite. This diazo solution is run at 5 to 10° C. into a solution of 14.4 parts of β-naphthol in 9 parts of caustic soda and 300 parts of water; when coupling is at an end, the mixture is heated to about 50° C., filtered and the solid matter washed with dilute caustic soda lye and then with water and dried in a vacuum at about 40° C.

The dye dissolves in organic solvents to blue-red solutions.

*Example 9.*—16.3 parts of amino-amylbenzene mixture of boiling point 128 to 140° C. under 15 mm. pressure are diazotized and coupled in manner analogous to that described in the preceding example with 13.7 parts of 3-amino-4-methoxy-1-methylbenzene. The monoazo dye which separates in the form of a resin is freed, after heating for 2 to 3 hours at 70 to 80° C., from unconsumed 3-amino-4-methoxy-1-methyl-benzene by extraction with dilute hydrochloric acid. For further diazotization, this dye is stirred, if desired while heating, with 54 parts by volume of hydrochloric acid of 12° Bé. and water; then diluted further to about 1000 to 1500 parts by volume and diazotized at 5 to 10° C. with 6.9 parts of sodium nitrite. This diazo solution is run into a solution of 24.3 parts of 2,3-hydroxynaphthoic acid-n-butylamide in 10 parts of caustic soda and water at 5 to 10° C. and the dye is worked up in manner similar to that described in the preceding examples.

The dye dissolves easily in organic solvents to violet solutions.

*Example 10.*—14.9 parts of amino-butylbenzene mixture of boiling point 115 to 144° C. under 14 mm. pressure, are diazotized. The diazo solution is mixed with a solution of 15.3 parts of amino-hydroquinone-dimethylether in 200 parts by volume of $$\frac{N}{2}$$

hydrochloric acid and there is gradually run in an aqueous solution of 42 parts of crystallized sodium acetate. When coupling is complete, the whole is filtered and the monoazo dye washed until neutral.

For the further diazotization the monoazo dye is stirred with 54 parts by volume of hydrochloric acid of 12° Bé. and hot water. Ice is added, and the mixture is diazotized at 5 to 10° C. with 6.9 parts of sodium nitrite. This diazo solution is run into an aqueous solution of 14.4 parts of β-naphthol and 9 parts of caustic soda. The dye obtained is easily soluble in organic solvents to blue-violet solutions.

*Example 11.*—The diazo compound of 14.9 parts of amino-butylbenzene mixture is coupled in the presence of sodium acetate with 18.7 parts of 1-amino-2-naphthol-ethyl-ether, which has been previously dissolved in the form of its hydrochloride in the necessary quantity of water. When the coupling is at an end, the monoazo dye is freed from unconsumed amino-naphthol-ethylether by extraction with dilute hydrochloric acid and diazotized as described in Example 10 and, further, coupled with 24.3 parts of 2,3-hydroxynaphthoic acid-n-butylamide dissolved in a dilute caustic soda lye containing 10 parts of caustic soda. The dye colors organic media green-blue. Clearer and greener dyes are obtained when the diazo compound of the monoazo dye is purified by salting out before it is coupled with the end component.

*Example 12.*—14.9 parts of amino-butylbenzene mixture of boiling point 115 to 144° C. under 14 mm. pressure are diazotized and the diazo compound is introduced into a solution containing 13.7 parts of 3-amino-4-methoxy-1-methylbenzene in 18 parts by volume of hydrochloric acid of 12° Bé. and 200 cc. of water. Then an aqueous solution of 42 parts of crystallized sodium acetate is added and the whole is stirred at 0 to 5° C. and then at room temperature until coupling has finished. The monoazo dye thus obtained is purified by extraction with dilute hydrochloric acid. Then it is further diazotized in a manner analogous to that described in Example 9 and the diazo compound is run into a solution of 14.4 parts of 2-hydroxynaphthalene in 9 parts of caustic soda and water at 5 to 10° C. When coupling is at an end, the mixture is heated to about 50° C., filtered and the solid dye washed with dilute caustic soda lye and then with water, and dried preferably under diminished pressure.

The dye dissolves in organic solvents to red-violet solutions.

It is obvious that the invention is not limited to the foregoing examples or to the specific details given therein. The tables given above and the numerous examples show how the invention may be put into practice, and every chemist skilled in the art may on account of this exhaustive disclosure produce similar dyes showing the same or similar properties when starting from the homologous or substituted diazo or azo components. All these possibilities are within the scope of the present invention and of the claims following hereafter.

What I claim is:

1. Water-insoluble azo dyes consisting of a mixture of isomeric compounds which have a diazo component of the benzene series substituted by the radicle

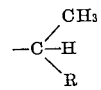

wherein R means an alkyl radicle, said dyes being freely soluble in benzene, linseed oil and butyl acetate.

2. Water-insoluble azo dyes consisting of a mixture of isomeric compounds which have a diazo component of the benzene series substituted by the radicle

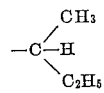

said dyes being freely soluble in benzene, linseed oil and butyl acetate.

3. Water-insoluble azo dyes consisting of a mixture of isomeric dyes, which correspond to the general formula

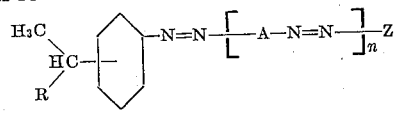

wherein R means alkyl, A is a radicle of the benzene series, Z stands for an end component and $n$ means one of the figures 0 and 1, said dyes being freely soluble in benzene, linseed oil and butyl acetate.

4. Water-insoluble azo dyes consisting of a mixture of isomeric dyes, which correspond to the general formula

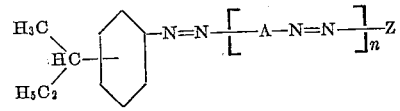

wherein A is a radicle of the benzene series, Z stands for a hydroxy compound selected from the group consisting of hydroxybenzenes and hydroxynaphthalenes and $n$ means one of the figures 0 and 1, said dyes being freely soluble in benzene, linseed oil and butyl acetate.

5. Water-insoluble azo dyes consisting of a mixture of isomeric dyes, which correspond to the general formula

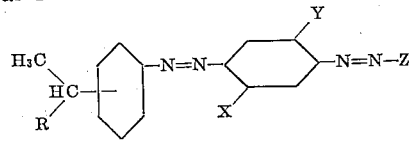

wherein R means alkyl, X is a member of the group consisting of alkyl and alkoxy, Y is a member of the group consisting of H, alkyl and alkoxy and Z is a hydroxy compound selected from the group consisting of hydroxy benzenes and hydroxynaphthalenes, said dyes being freely soluble in benzene, linseed oil and butyl acetate 6. Water-insoluble azo dyes consisting of a mixture of isomeric dyes, which correspond to the general formula

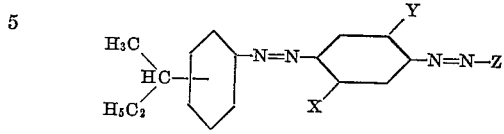

wherein X is a member of the group consisting of alkyl and alkoxy, Y is a member of the group consisting of H, alkyl and alkoxy and Z is a hydroxy compound selected from the group consisting of hydroxy benzenes and hydroxynaphthalenes, said dyes being freely soluble in benzene, linseed oil and butyl acetate.

7. Water-insoluble azo dyes consisting of a mixture of isomeric dyes, which correspond to the general formula

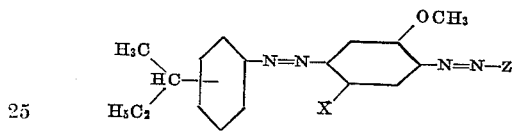

wherein X is a member of the group consisting of alkyl and alkoxy and Z is a hydroxy compound selected from the group consisting of hydroxybenzenes and hydroxynaphthalenes, said dyes being freely soluble in benzene, linseed oil and butyl acetate.

8. Water-insoluble azo dyes consisting of a mixture of isomeric dyes, which correspond to the general formula

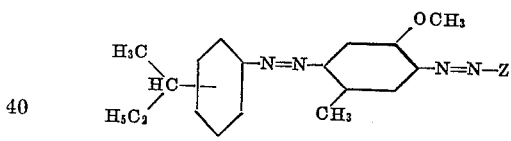

wherein Z is a hydroxy compound selected from the group consisting of hydroxybenzenes and hydroxynaphthalenes, said dyes being freely soluble in benzene, linseed oil and butyl acetate.

9. Water-insoluble azo dyes consisting of a mixture of isomeric dyes, which correspond to the general formula

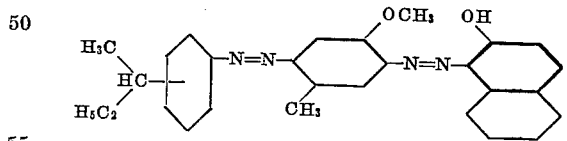

said dyes being freely soluble in benzene, linseed oil and butyl acetate.

10. Water-insoluble azo dyes consisting of a mixture of isomeric dyes, which correspond to the general formula

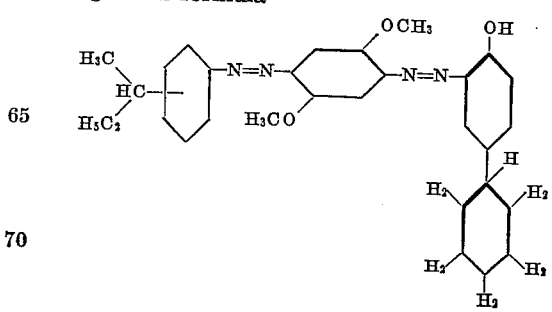

said dyes being freely soluble in benzene, linseed oil and butyl acetate.

11. The process which comprises diazotizing a mixture of amines of the general formula

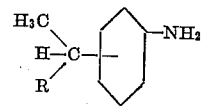

wherein R means alkyl, coupling the diazo compound with an amine of the general formula

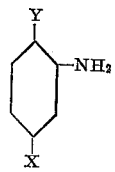

wherein X is a member of the group consisting of alkyl and alkoxy, and Y is a member of the group consisting of H, alkyl and alkoxy, further diazotizing the monoazo dye thus obtained and coupling the diazo azo compound with a hydroxy compound selected from the group consisting of hydroxybenzenes and hydroxynaphthalenes.

12. The process which comprises diazotizing a mixture containing the isomeric amino-sec.-butyl-benzenes, coupling the diazo compound with an amine of the general formula

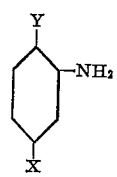

wherein X is a member of the group consisting of alkyl and alkoxy and Y is a member of the group consisting of H, alkyl and alkoxy, further diazotizing the monoazo dye thus obtained and coupling the diazo azo compound with a hydroxy compound selected from the group consisting of hydrobenzenes and hydroxynaphthalenes.

13. The process which comprises diazotizing a mixture containing the isomeric amino-sec.-butyl-benzenes, coupling the diazo compound with an amine of the general formula

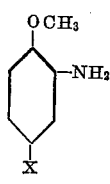

wherein X is a member of the group consisting of alkyl and alkoxy, further diazotizing the monoazo dye thus obtained and coupling the diazo azo compound with a hydroxy compound selected from the group consisting of hydroxyzenzenes and hydroxynaphthalenes.

14. The process which comprises diazotizing a mixture containing the isomeric amino-sec.-butylbenzenes, coupling the diazo compound with 1-methyl-3-amino-4-methoxy benzene, further diazotizing the monoazo dye thus obtained and coupling the diazo azo compound with 2-hydroxynaphthalene.

15. The process which comprises diazotizing a mixture containing the isomeric amino-sec.-butylbenzenes, coupling the diazo compound with 1,4-dimethoxy-3-aminobenzene, further diazotizing the monoazo dye thus obtained and coupling the diazo azo compound with 4-cyclohexyl-1-hydroxybenzene.

ALFRED THURM.